United States Patent
Masuda et al.

(10) Patent No.: US 11,635,903 B2
(45) Date of Patent: Apr. 25, 2023

(54) CLOUD DATA MIGRATION

(71) Applicant: International Business Machines Corporation, Armonk, NY (US)

(72) Inventors: Koichi Masuda, Tokyo (JP); Shinsuke Mitsuma, Machida (JP); Eiji Tosaka, Kita-ku (JP); Naoki Imai, Yokohama (JP); Yuki Asakura, Urayasu (JP)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 17/348,669

(22) Filed: Jun. 15, 2021

(65) Prior Publication Data

US 2022/0398027 A1 Dec. 15, 2022

(51) Int. Cl.
  *G06F 12/00* (2006.01)
  *G06F 13/00* (2006.01)
  *G06F 3/06* (2006.01)

(52) U.S. Cl.
  CPC .......... *G06F 3/0635* (2013.01); *G06F 3/0604* (2013.01); *G06F 3/067* (2013.01); *G06F 3/0647* (2013.01)

(58) Field of Classification Search
  CPC .... G06F 3/0635; G06F 3/0604; G06F 3/0647; G06F 3/067
  USPC .......................................................... 711/154
  See application file for complete search history.

(56) References Cited

U.S. PATENT DOCUMENTS

| | | | |
|---|---|---|---|
| 10,122,806 B1* | 11/2018 | Florissi | G06F 16/25 |
| 2012/0115476 A1* | 5/2012 | Shin | G06Q 10/06 455/435.1 |
| 2013/0329049 A1* | 12/2013 | Haas | B61L 23/042 348/159 |
| 2017/0058858 A1* | 3/2017 | Moose | F03B 17/04 |
| 2017/0328725 A1* | 11/2017 | Schlesinger | G01C 21/3461 |
| 2019/0104052 A1* | 4/2019 | Cidon | H04L 43/0829 |
| 2019/0238446 A1* | 8/2019 | Barzik | G06F 3/061 |
| 2019/0379594 A1* | 12/2019 | Johnsen | H04L 45/48 |
| 2020/0159315 A1* | 5/2020 | Myers | G06F 11/3438 |
| 2020/0159651 A1* | 5/2020 | Myers | G06F 30/20 |
| 2020/0267125 A1 | 8/2020 | Gunasingam | |

(Continued)

FOREIGN PATENT DOCUMENTS

| | | |
|---|---|---|
| CN | 103324592 A | 9/2013 |
| CN | 108959573 A | 12/2018 |

(Continued)

OTHER PUBLICATIONS

"Patent Cooperation Treaty PCT Notification of Transmittal of the International Search Report and the Written Opinion of the International Searching Authority, or the Declaration", Applicant's file reference EIE220335PCT, International application No. PCT/CN20221/091539, International filing date May 7, 2022 (May 7, 2022), dated Jul. 29, 2022 (dated Jul. 29, 2022), 8 pages.

*Primary Examiner* — Sheng Jen Tsai (74) *Attorney, Agent, or Firm* — David B. Woycechowsky (57) ABSTRACT

A data storage change is received for a piece of data, wherein the data storage change is from a first location to a second location. Two or more possible paths to perform the data storage change are determined. A plurality of weights for each path of the two or more paths is determined. A weighted transfer time for each path of the two or more paths is determined.

2 Claims, 7 Drawing Sheets

| Path | Recall path | Start cluster | Copy path | End cluster | Premig path |
|---|---|---|---|---|---|
| (1) | CloudA to C2 | C2 | C2 to C1 | C1 | C1 to Cloudn |
| (2) | CloudA to C2 | C2 | None | C2 | C2 to Cloudn |
| (3) | CloudA to C2 | C2 | C2 to CN | CN | CN to Cloudn |
| (4) | CloudA to C3 | C3 | C3 to C1 | C1 | C1 to Cloudn |
| (5) | CloudA to C3 | C3 | C3 to C2 | C2 | C2 to Cloudn |
| (6) | CloudA to C3 | C3 | C3 to CN | CN | CN to Cloudn |
| (7) | None | C4 | C4 to C1 | C1 | C1 to Cloudn |
| (8) | None | C4 | C4 to C2 | C2 | C2 to Cloudn |
| (9) | None | C4 | C4 to CN | CN | CN to Cloudn |
| (10) | None | CN | CN to C1 | C1 | C1 to Cloudn |
| (11) | None | CN | CN to C2 | C2 | C2 to Cloudn |
| (12) | None | CN | None | CN | CN to Cloudn |

(56) References Cited

U.S. PATENT DOCUMENTS

| | | | |
|---|---|---|---|
| 2020/0320397 A1* | 10/2020 | Liu | G06N 3/006 |
| 2020/0393254 A1* | 12/2020 | Gardner | G01C 21/3438 |
| 2021/0026707 A1* | 1/2021 | Rosenberg | G06F 9/485 |
| 2021/0133085 A1* | 5/2021 | Myers | G06F 11/3688 |
| 2021/0144517 A1* | 5/2021 | Guim Bernat | G06F 11/3006 |
| 2021/0165107 A1* | 6/2021 | Regikumar | G01S 19/393 |
| 2021/0221613 A1* | 7/2021 | Liu | G06Q 10/06313 |
| 2021/0253128 A1* | 8/2021 | Nister | B60W 60/0027 |
| 2021/0326358 A1* | 10/2021 | Seelemann, II | G06F 16/24542 |
| 2022/0035551 A1* | 2/2022 | Iyer | G06F 3/0653 |

FOREIGN PATENT DOCUMENTS

| | | |
|---|---|---|
| WO | 2018049937 A1 | 3/2018 |
| WO | 2018178918 A1 | 10/2018 |

\* cited by examiner

| Path | Recall path | Start cluster | Copy path | End cluster | Premig path |
|---|---|---|---|---|---|
| (1) | CloudA to C2 | C2 | C2 to C1 | C1 | C1 to Cloudn |
| (2) | CloudA to C2 | C2 | None | C2 | C2 to Cloudn |
| (3) | CloudA to C2 | C2 | C2 to CN | CN | CN to Cloudn |
| (4) | CloudA to C3 | C3 | C3 to C1 | C1 | C1 to Cloudn |
| (5) | CloudA to C3 | C3 | C3 to C2 | C2 | C2 to Cloudn |
| (6) | CloudA to C3 | C3 | C3 to CN | CN | CN to Cloudn |
| (7) | None | C4 | C4 to C1 | C1 | C1 to Cloudn |
| (8) | None | C4 | C4 to C2 | C2 | C2 to Cloudn |
| (9) | None | C4 | C4 to CN | CN | CN to Cloudn |
| (10) | None | CN | CN to C1 | C1 | C1 to Cloudn |
| (11) | None | CN | CN to C2 | C2 | C2 to Cloudn |
| (12) | None | CN | None | CN | CN to Cloudn |

CLOUD DATA MIGRATION

BACKGROUND

The present invention relates generally to the field of data storage, and more particularly to optimizing cloud data migration.

Hierarchical storage management (HSM) refers to data storage by efficiently managing the data using an expensive primary storage with a higher more efficient access rate in combination with a more inexpensive secondary storage with a lower less efficient access rate. HSM may include any number of levels of storage with varying levels of efficiencies and costs.

The term "premigration" or "to premigrate" is to make a copy of a volume in the primary storage to the secondary storage. The term "migration" or "to migrate" denotes deleting a volume in the primary storage, usually after premigration. The operation of returning the migrated volume, which is stored in the secondary storage, to the primary storage is referred to as "recall" or "to recall". Premigration and recall involve making a copy of the data and it is assumed to take some time as the operations are performed according to a queueing mechanism.

SUMMARY

Embodiments of the present invention disclose a computer-implemented method, a computer program product, and a system for data migration. In one embodiment, a data storage change is received for a piece of data, wherein the data storage change is from a first location to a second location. Two or more possible paths to perform the data storage change are determined. A plurality of weights for each path of the two or more paths is determined. A weighted transfer time for each path of the two or more paths is determined.

DETAILED DESCRIPTION

The present invention provides a method, computer program product, and computer system for applying an optimal path for data location changes. Embodiments of the present invention recognize that that a user may wish to prioritize or avoid a specific cluster and/or cloud storage during data transfer.

Embodiments of the present invention provide for all possible paths that enable a copy of volume to a cloud storage as a migration destination are examined. Embodiments of the present invention provide for determining the time required to make a copy using each path is calculated from current performance and a queue accumulation state. Embodiments of the present invention provide for, parameters that can be set by users are also introduced to allow users to avoid use of a certain path or cluster to the utmost because recall from a cloud storage may raise expenses or a user may wish to keep a certain cluster away from background processing as much as possible to prioritize another job by the user.

Figure 1:
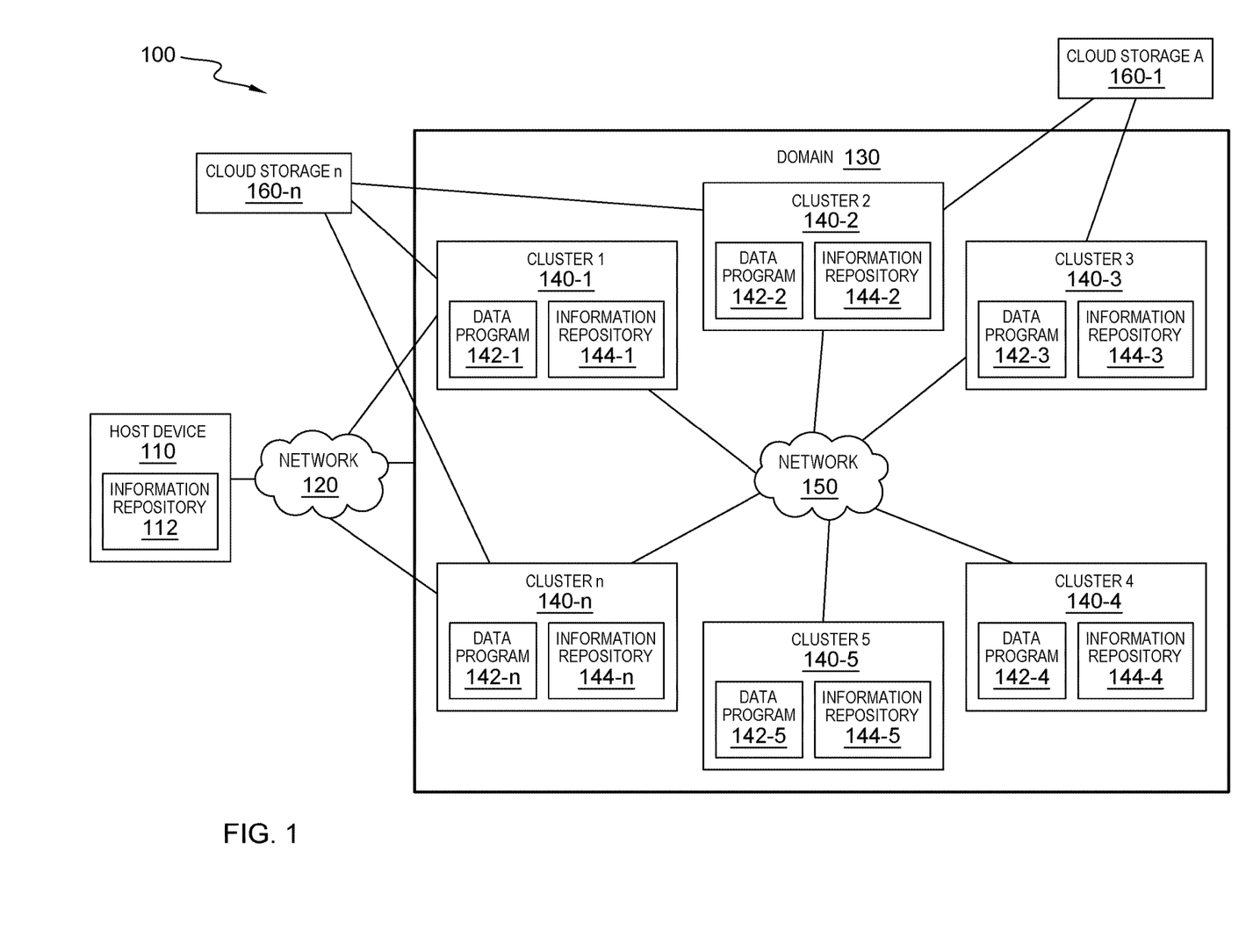
FIG. 1 is a functional block diagram of a network computing environment, generally designated 100, suitable for operation of data program 142-*n*, in accordance with at least one embodiment of the invention.

Referring now to various embodiments of the invention in more detail, FIG. 1 is a functional block diagram of a network computing environment, generally designated 100, suitable for operation of data program 142-*n*, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes host device 110, domain 130, and cloud storage 160-*n*, interconnected over network 120. In an embodiment, network computing environment may include any number of host device 110, any number of domain 130, and any number of cloud storage n 160-*n*. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between host device 110, devices of domain 130, cloud storage n 160-*n*, and other computing devices (not shown) within network computing environment 100. In an embodiment, network 120 may be a fiber connection (FICON) network using fiber optic channel technology, a storage area network (SAN), or any network that allows that allows for host-device connections.

Host device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, host device 110 represents any programmable electronic devices or combination of programmable electronic devices capable of executing machine readable program instructions and communicating with other computing devices (not shown) within computing environment 100 via a network, such as network 120.

In various embodiments of the invention, host device 110 may be a computing device that can be a standalone device, a management server, a web server, a media server, a mobile computing device, or any other programmable electronic device or computing system capable of receiving, sending, and processing data. In other embodiments, host device 110 represents a server computing system utilizing multiple computers as a server system, such as in a cloud computing environment. In an embodiment, host device 110 represents a computing system utilizing clustered computers and components (e.g., database server computers, application server computers, web servers, and media servers) that act as a single pool of seamless resources when accessed within network computing environment 100.

In an embodiment, host device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, host device 110 includes information repository 112. In an embodiment, information repository 112 may be managed by one or more programs (not shown) of host device 110. In an alternative embodiment, information repository 112 may be managed by the operating system of host device 110. Information repository 112 is a data repository that can store, gather, and/or analyze information. In some embodiments, information repository 112 is located externally to host device 110 and accessed through a communication network, such as network 120. In some embodiments, information repository 112 is stored on host device 110. In some embodiments, information repository 112 may reside on another computing device (not shown), provided information repository 112 is accessible by host device 110. In an embodiment, information repository 114 may include data, including, but not limited to, volumes of data that may be stored, currently, in the past, or in the future, on host device 110, within domain 130 and/or cloud storage n 160-n.

Information repository 112 may be implemented using any volatile or non-volatile storage media for storing information, as known in the art. For example, information repository 112 may be implemented with a tape library, optical library, one or more independent hard disk drives, multiple hard disk drives in a redundant array of independent disks (RAID), solid-state drives (SSD), or random-access memory (RAM). Similarly, information repository 112 may be implemented with any suitable storage architecture known in the art, such as a relational database, an object-oriented database, or one or more tables.

Domain 130 includes cluster 1 140-1, cluster 2 140-2, cluster 3 140-3, cluster 4 140-4, cluster 5 140-5, and cluster n 140-n, interconnected over network 150. It should be noted domain 130 may include any number of cluster n 140-n, for example, two cluster, five cluster, one hundred cluster, or any number of cluster (n). In an embodiment, domain 130 is two or more physically separated cluster n 140-n.

In embodiments of the present invention, network 150 can be a telecommunications network, a local area network (LAN), a wide area network (WAN), such as the Internet, or a combination of the three, and can include wired, wireless, or fiber optic connections. Network 150 may include one or more wired and/or wireless networks that are capable of receiving and transmitting data, voice, and/or video signals, including multimedia signals that include voice, data, and video formation. In general, network 150 may be any combination of connections and protocols that will support communications between cluster 1 140-1, cluster 2 140-2, cluster 3 140-3, cluster 4 140-4, cluster 5 140-5, and cluster n 140-n, and other computing devices (not shown) within network computing environment 100. It should be noted, while not shown, network 150 may allow for communication between any devices within domain 130 and any cloud storage n 160-n. For example, cluster 140-n may connect to cloud storage n 160-n via a network. In an embodiment, network 150 may be a public and/or private network.

Cluster n 140-n is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, cluster n 140-n represents any programmable electronic devices or combination of programmable electronic devices capable of executing machine readable program instructions and communicating with other computing devices (not shown) within computing environment 100 via a network, such as network 120 or within domain 130 via a network, such as network 150. In an embodiment, cluster n 140-n may be a disk-only cluster that does not attached to a physical tape library, a cluster that does attach to a physical tape library, or a combination of both.

In various embodiments of the invention, cluster n 140-n may be a computing device that can be a standalone device, a management server, a web server, a media server, a mobile computing device, or any other programmable electronic device or computing system capable of receiving, sending, and processing data. In other embodiments, cluster n 140-n represents a server computing system utilizing multiple computers as a server system, such as in a cloud computing environment. In an embodiment, cluster n 140-n represents a computing system utilizing clustered computers and components (e.g., database server computers, application server computers, web servers, and media servers) that act as a single pool of seamless resources when accessed within network computing environment 100.

In an embodiment, cluster n 140-n includes data program 142-n and information repository 144-n. For example, cluster 1 140-1 includes data program 142-1 and information repository 144-1, cluster 2 140-2 includes data program 142-2 and information repository 144-2, cluster 3 140-3 includes data program 142-3 and information repository 144-3, cluster 4 140-4 includes data program 142-4 and information repository 144-4, and cluster 5 140-5 includes data program 142-5 and information repository 144-5.

Embodiments of the present invention provide for a data program **142-*n* for applying an optimal path for data location changes. In an embodiment, each cluster n 140-*n* has a local copy of data program 142-*n*. Here, each program may perform some or all of the steps outlined in the flowcharts discussed below. In an embodiment, domain 130 may have a single data program 142-*n*** that performs the steps outlined in the flowcharts discussed below.

In an embodiment, data program **142-*n* receives a data storage change. In an embodiment, data program 142-*n* determines possible paths for the data change. In an embodiment, data program 142-*n* determines weights for the possible paths. In an embodiment, data program 142-*n* determines the weighted transfer times for the data storage change. In an embodiment, data program 142-*n* applies the optimal path for the data storage change. In an embodiment, data program 142-*n* determines whether the optimal path requires a recall. In an embodiment, data program 142-*n* recalls the data. In an embodiment, data program 142-*n* determines whether the optimal path requires a copy. In an embodiment, data program 142-*n* copies the data. In an embodiment, data program 142-*n* premigrates data. In an embodiment, data program 142-*n*** deletes data.

In an embodiment, cluster n **140-*n* includes and information repository 144-*n*. In an embodiment, information repository 144-*n* may be managed by data program 142-*n*. In an alternative embodiment, information repository 144-*n* may be managed by the operating system of cluster n 140-*n*, another program (not shown), alone, or together with, data program 142-*n*. Information repository 144-*n* is a data repository that can store, gather, and/or analyze information. In some embodiments, information repository 144-*n* is located externally to cluster n 140-*n* and accessed through a communication network, such as network 150. In some embodiments, information repository 144-*n* is stored on cluster n 140-*n*. In some embodiments, information repository 144-*n* may reside on another computing device (not shown), provided information repository 144-*n* is accessible by cluster n 140-*n*. In an embodiment, information repository 144-*n* may include data, including, but not limited to, volumes of data that may be stored, currently, in the past, or in the future, on host device 110, within domain 130 and/or cloud storage n 160-*n*. In an embodiment, each information repository 144-*n* has database storing information for all volumes of data stored within domain 130 and the database is synchronized among all cluster n 140-*n***.

In an embodiment, information repository **144-*n* may include queuing data. During data transfer, each data transfer is processed sequentially using a queuing mechanism. In an embodiment, each clusters has a recall queue and a premigrate queue. In an embodiment, when making a copy between clusters, a destination cluster of the copy has a queue. In the case of clusters connected to several clouds, a recall queue and a premigrate queue directed to these clouds are shared among clusters. Regarding a queue to copy among clusters, a shared copy queue is used regardless of which cluster is a copy source. A total size of volumes in respective queues of clusters and statistical information such as transfer rates of respective paths to recall, copy, and premigrate are also stored in information repository 144-*n* shared among all clusters and their respective information repository 144-*n***.

Information repository **144-*n* may be implemented using any volatile or non-volatile storage media for storing information, as known in the art. For example, information repository 144-*n* may be implemented with a tape library, optical library, one or more independent hard disk drives, multiple hard disk drives in a redundant array of independent disks (RAID), solid-state drives (SSD), or random-access memory (RAM). Similarly, information repository 144-*n*** may be implemented with any suitable storage architecture known in the art, such as a relational database, an object-oriented database, or one or more tables.

Cloud storage n **160-*n* is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. It should be noted environment 100 may include any number of cloud storage n 160-*n*, for example, two cloud storage, five cloud storage, one hundred cloud storage, or any number of cloud storage (n). In general, cloud storage n 160-*n* represents any programmable electronic devices or combination of programmable electronic devices capable of executing machine readable program instructions and communicating with other computing devices (not shown) within computing environment 100 via a network, such as network 120 and/or network 150**.

In various embodiments of the invention, cloud storage n **160-*n* may be a computing device that can be a standalone device, a management server, a web server, a media server, a mobile computing device, or any other programmable electronic device or computing system capable of receiving, sending, and processing data. In other embodiments, cloud storage n 160-*n* represents a server computing system utilizing multiple computers as a server system, such as in a cloud computing environment. In an embodiment, cloud storage n 160-*n* represents a computing system utilizing clustered computers and components (e.g., database server computers, application server computers, web servers, and media servers) that act as a single pool of seamless resources when accessed within network computing environment 100**.

Figure 2:
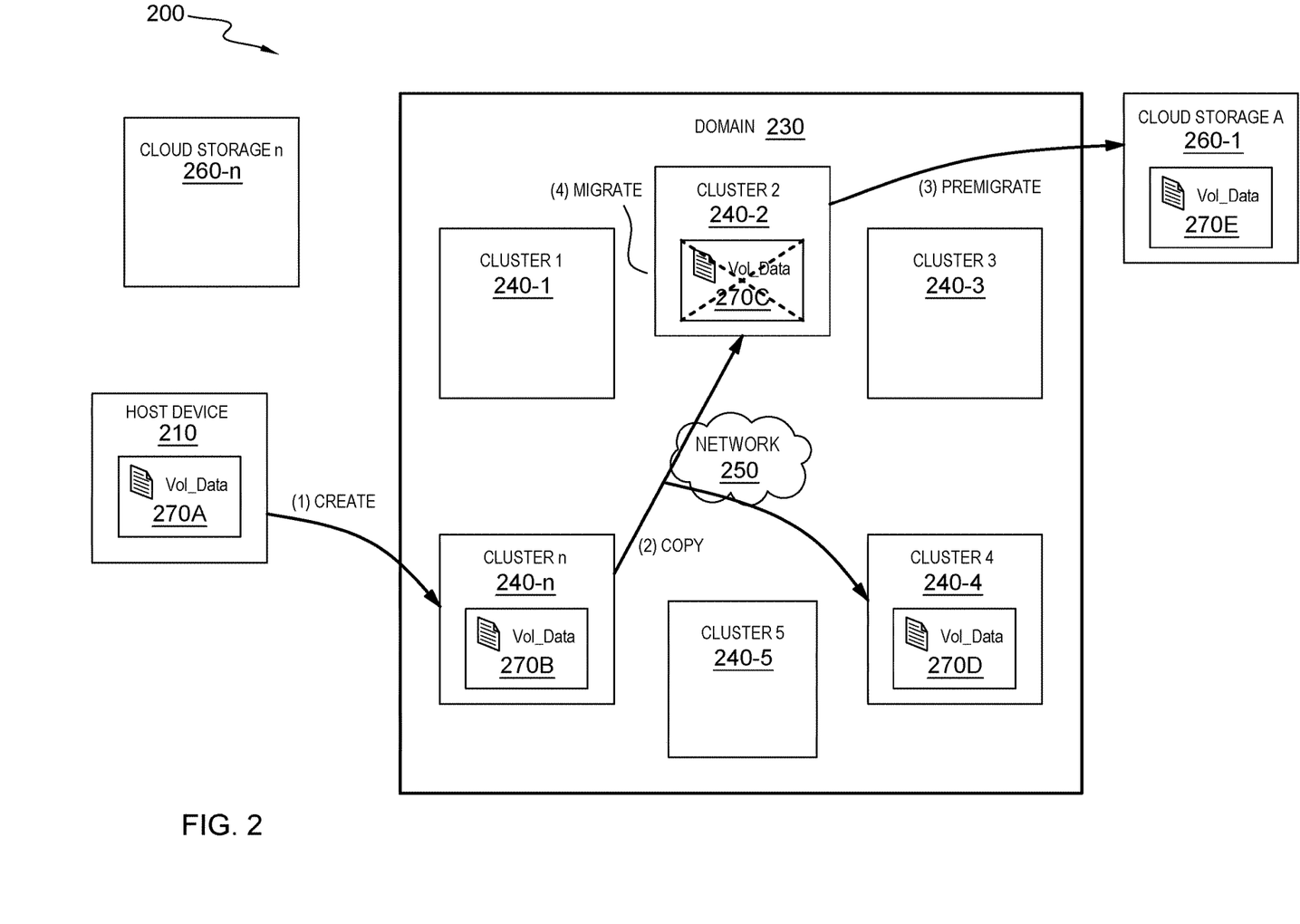
FIG. 2 is a functional block diagram of a network computing environment, generally designated 200, suitable for operation of data program 142-*n* showing a primary copy policy involving premigration to cloud storage along with migration, in accordance with at least one embodiment of the invention.

FIG. 2 is a functional block diagram of a network computing environment, generally designated 200, suitable for operation of data program **142-*n* showing a primary copy policy involving premigration to cloud storage along with migration, in accordance with at least one embodiment of the invention. It should be noted, primary copy policy involving premigration to cloud storage along with migration may currently be performed by a hierarchical storage management (HSM) system that manages domain 130. It should also be noted, the elements found in network computing environment 200 are substantially similar to the similarly identified elements of network computing environment 100 and network computing environment 300. For example, domain 130 is substantially similar to domain 230, cluster 1 140-1 is substantially similar to cluster 1 240-1, and network 150 is substantially similar to network 250. It should also be noted, network computing environment 200, for simplicity and ease of discussion, includes elements that are not shown but are found in networking computing environment 100, including but not limited to information repository 112, network 120, connection lines for network 120, connection lines for network 150, data program 142-*n*, and information repository 144-*n*. Additionally, throughout the discussion of workflow 400, data will be stored, copied, premigrated, and migrated from information repository 112 and/or information repository 144-*n***.

Figure 3:
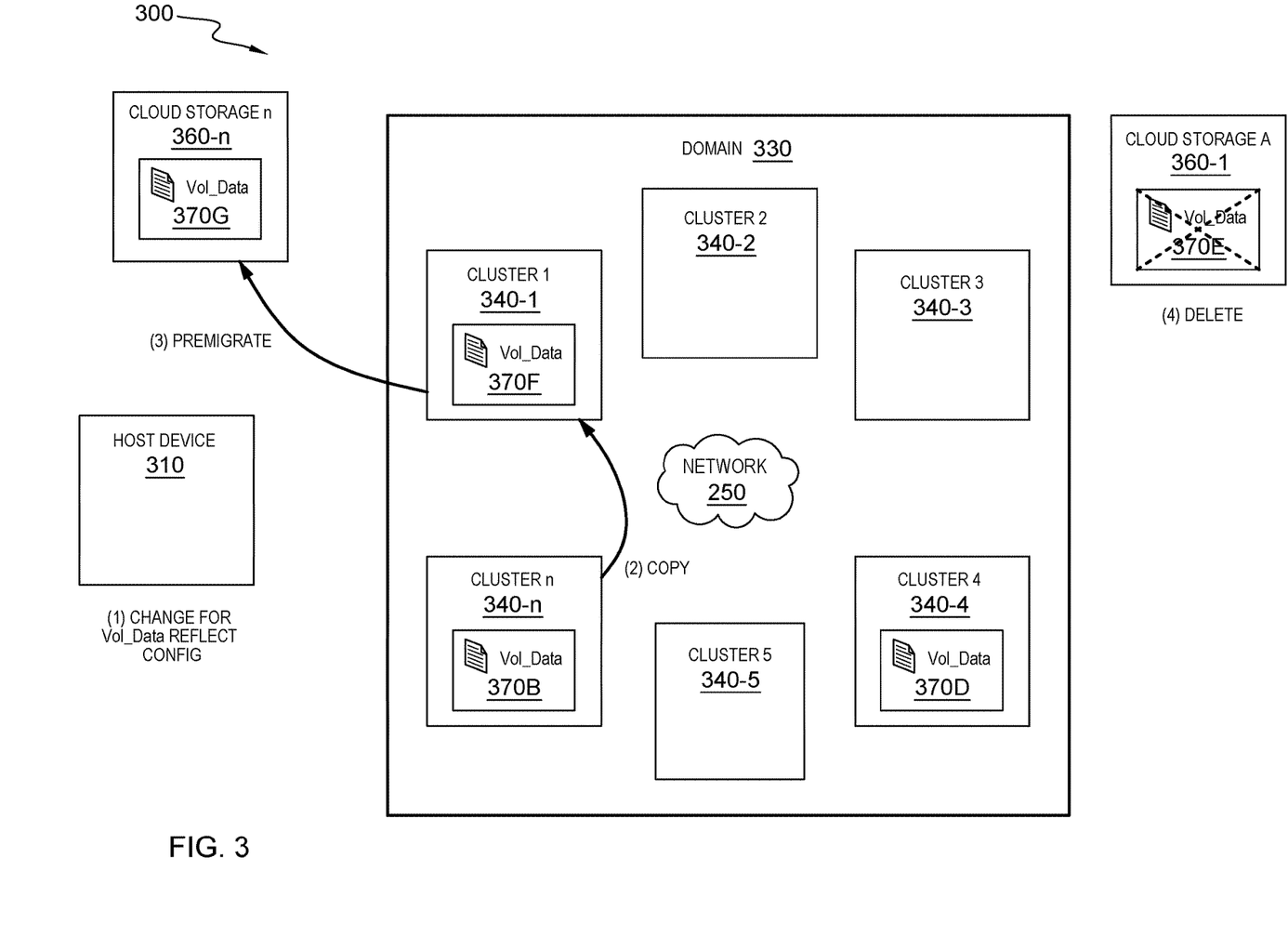
FIG. 3 is a functional block diagram of a network computing environment, generally designated 300, suitable for operation of data program 142-*n* showing a cloud migration, in accordance with at least one embodiment of the invention.

FIG. 3 is a functional block diagram of a network computing environment, generally designated 300, suitable for operation of data program 142-*n* showing a cloud migration, in accordance with at least one embodiment of the invention. It should be noted, cloud migration may currently be performed by a hierarchical storage management (HSM) system that manages domain 130. It should also be noted, the elements found in network computing environment 300 are substantially similar to the similarly identified elements of network computing environment 200 and network computing environment 100. For example, domain 130 is substantially similar to domain 330, cluster 2 140-2 is substantially similar to cluster 2 340-2, cluster 3 140-3 is substantially similar to cluster 3 340-3, cluster 4 140-4 is substantially similar to cluster 4 340-4, cluster 5 140-5 is substantially similar to cluster 5 340-5, cluster n 140-*n* is substantially similar to cluster n 340-*n*, host device 110 is substantially similar to host device 310, and network 150 is substantially similar to network 350. It should also be noted, network computing environment 300, for simplicity and ease of discussion, includes elements that are not shown but are found in networking computing environment 100, including but not limited to information repository 112, network 120, connection lines for network 120, connection lines for network 150, data program 142-*n*, and information repository 144-*n*. Additionally, throughout the discussion of workflow 500, data will be stored, copied, premigrated, and migrated from information repository 112 and/or information repository 144-*n*.

Figure 4:
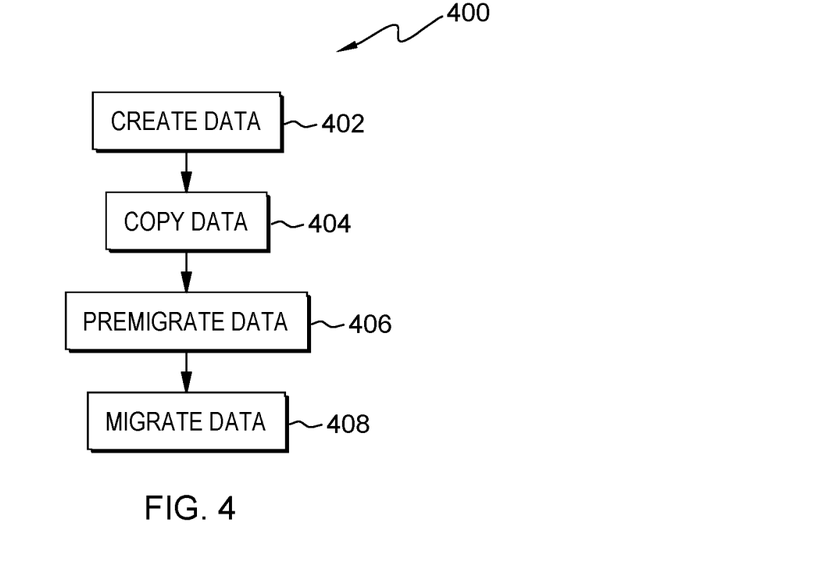
FIG. 4 is a flow chart diagram depicting operational steps for data program 142-*n* for a primary copy policy involving premigration to cloud storage along with migration as shown in in FIG. 2, in accordance with at least one embodiment of the invention.

FIG. 4 is a flow chart diagram depicting operational steps for data program 142-*n* for a primary copy policy involving premigration to cloud storage along with migration as shown in in FIG. 2, in accordance with at least one embodiment of the invention. It should be noted that Vol_Data 270A, Vol_Data 270B, Vol_Data 270C, Vol_Data 270D, and Vol_Data 270E are the same versions of Vol_Data all found in different locations. In step 402, "(1) create", data is created. In other words, Vol_Data 270A is created with a copy policy requiring a copy of Vol-Data 270A on cluster 2 240-2, cluster 4 240-4, and cluster n 240-*n*. Vol_Data 270A is copied from host device 210 to Vol_Data 270B on cluster n 240-*n*. In step 404, "(2) copy", the Vol_Data 270B is copied to Vol_Data 270C on cluster 2 240-2 and Vol_Data 270D on cluster 4 240-4. An indication is then received to move Vol_Data 270C to cloud storage and remove from cluster 2 240-2. In step 406, "(3) premigrate", Vol_Data 270E is premigrated to Vol_Data 270E on cloud storage A 260-1. In step 408, "(4) migrate", Vol_Data 270C is migrated from cluster 2 240-2, in other words removed from cluster 2 240-2.

Figure 5:
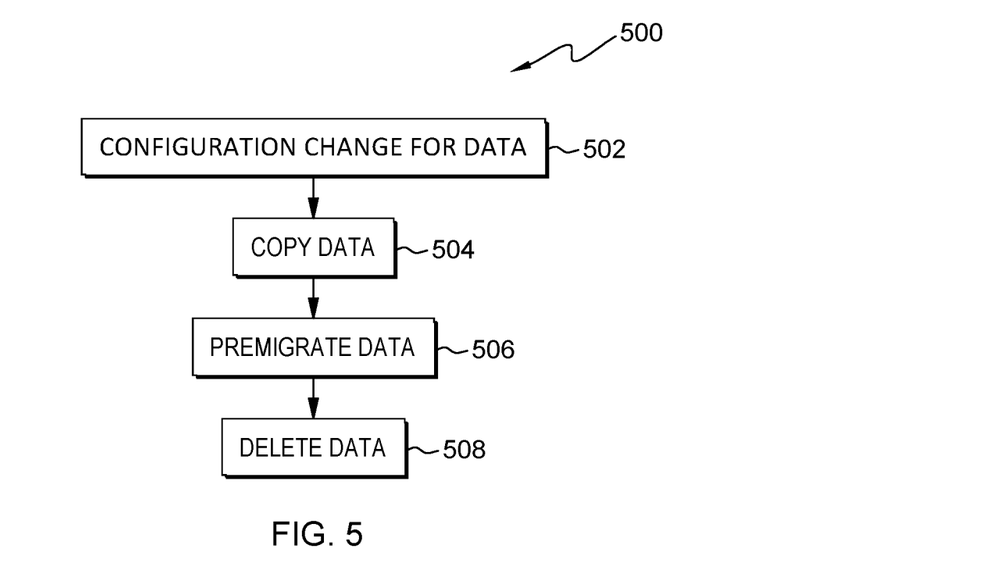
FIG. 5 is a flow chart diagram depicting operational steps for data program 142-*n* for a cloud migration as shown in FIG. 3, in accordance with at least one embodiment of the invention.

FIG. 5 is a flow chart diagram depicting operational steps for data program 142-*n* for a cloud migration as shown in FIG. 3, in accordance with at least one embodiment of the invention. It should be noted that Vol_Data 370A, Vol_Data 370B, Vol_Data 370C, Vol_Data 370D, and Vol_Data 370E are the same versions of Vol_Data 370 all found in different locations. In step 502, "(1) Reflect Config Change for Vol_Data", a configuration change for the data is received. In step 502, the data change is for Vol_Data 370E to be removed from cloud storage A 360-1 and for Vol_Data 370F to be copied to cloud storage n 360-*n*. In step 504, "(2) copy", the Vol-Data 370B is copied to Vol_Data 370F on cluster 1 340-1. In step 506, "(3) premigrate", Vol_Data 370F is premigrated to Vol_Data 370G on cloud storage n 360-*n*. In step 508, "(4) delete", Vol_Data 370E is deleted from cloud storage A 360-1, in other words removed from cloud storage A 360-1.

Figure 6:
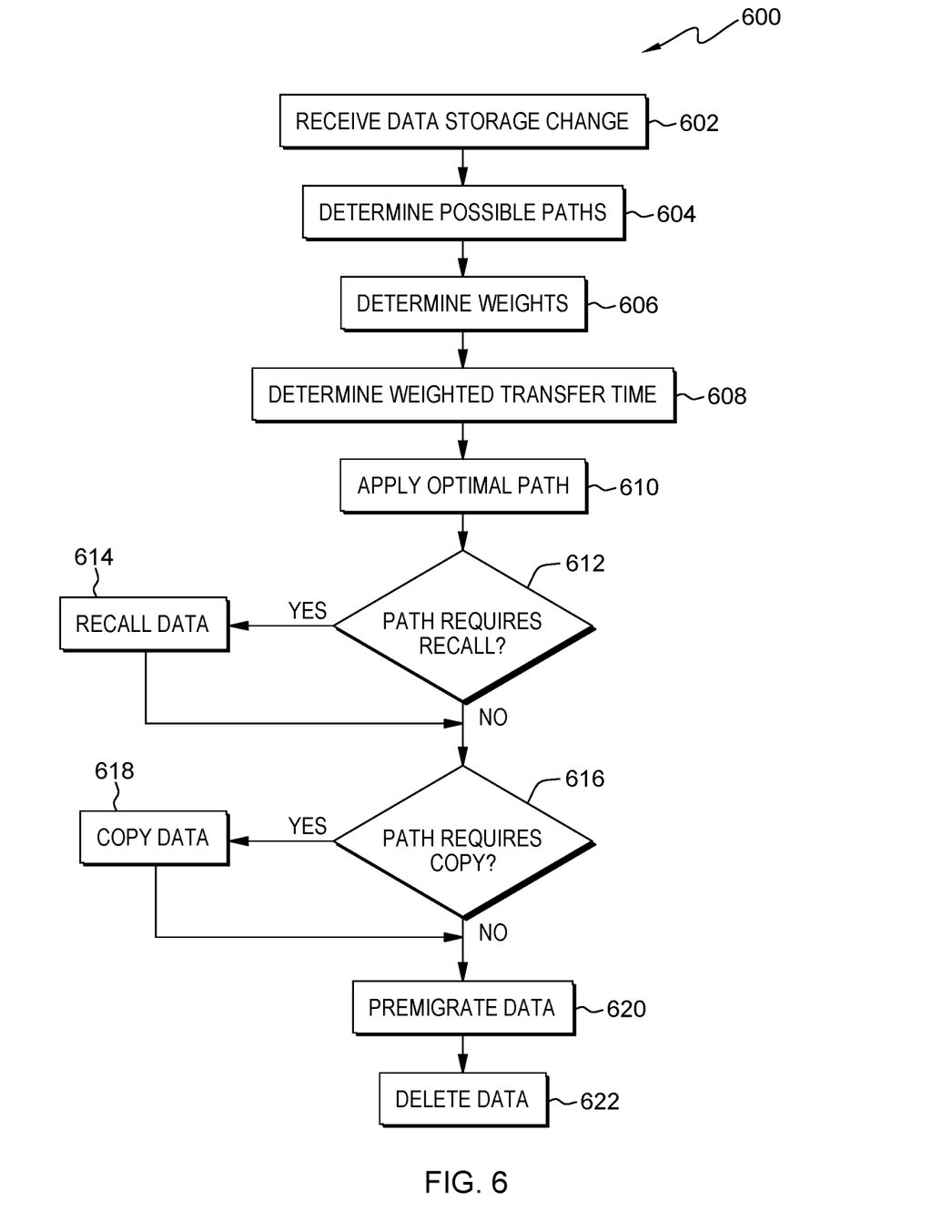
FIG. 6 is a flow chart diagram depicting operational steps for data program 142-*n* for applying an optimal path for data location changes within network computing environment 100, in accordance with at least one embodiment of the invention.

FIG. 6 is a flow chart diagram of workflow 600 depicting operational steps for data program 142-*n* applying an optimal path for data location changes within network computing environment 100, in accordance with at least one embodiment of the invention. In an alternative embodiment, the steps of workflow 600 may be performed by one or more versions of data program 142-*n* or any other program (not shown) while working with data program 142-*n*. In yet another alternative embodiment, a first version of data program 142-*n*, for example data program 142-1, may perform some of the steps of workflow 600 while a second version (or more versions) of data program 142-*n*, for example program 142-2, may perform some of the steps of workflow 600. It should be appreciated that embodiments of the present invention provide at least for applying an optimal path for data location changes. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 600 upon a user wanting to change storage locations of data.

Data program 142-*n* receives data storage change (step 602). At step 602, data program 142-*n* receives an indication for a data storage location change for a piece of data. In an embodiment, the data storage change may to add storage locations for the data. For example, the data storage change may be to have the data stored on cluster 3 240-3, where the data did not currently exist. In another example, the data storage change may be to have the data stored on cloud storage n 260-*n*, where the data did not currently exist. In an embodiment, the data storage change may be to remove storage locations for the data. For example, the data storage change may be to have the data removed from cluster 5 240-5, where the data currently exists. In another example, the data storage change may be to have the data removed from cloud storage A 260-1, where the data currently exists. In an embodiment, the data may be a volume of data, for example Vol_Data 270A, Vol_Data 270B, Vol_Data 270C, Vol_Data 270D, and Vol_Data 270E as shown in FIG. 2 and Vol_Data 370B, Vol_Data 370C, Vol_Data 370D, and Vol_Data 370E as shown in FIG. 3.

Data program 142-*n* determines possible paths (step 604). At step 604, data program 142-*n* determines the possible paths within network computing environment 100 to perform the data storage change of step 602. In an embodiment, data program 142-*n* may determine a single possible path. In an embodiment, data program 142-*n* may determine multiple possible paths. In an embodiment, data program 142-*n* determines the locations where the data of the data storage change of step 602 is located and these locations are classified as start points. In an embodiment, if the start point is a cloud storage n 160-*n*, then each cluster n 140-*n* that is connected to cloud storage n 160-*n* is classified as the start point and paths to these clusters are called recall paths. In an embodiment, if the start point is a cluster n 140-*n*, the start point serves as the start cluster and there is no recall path. In an embodiment, data program 142-*n* determines the end location for the data of the data storage change of step 602 is located and this location is classified as the end point. In an embodiment, if the end location of the data is a cloud storage n 160-*n*, then each cluster n 140-*n* that is connected to cloud storage n 160-*n* is classified as the end point and paths to the cloud storage n 160-*n* are called premigrate paths. In an embodiment, if the end location of the data is a cluster n 140-*n* then the cluster n 140-*n* is the end point and there is no premigrate path. Therefore, combinations of start points (clusters) and end points (clusters) provide all possible paths. In an embodiment, paths between start points and end points are referred to as copy paths. If a start point is the same as an end point there is no copy path. An example of data paths is shown below.

Figure 7:
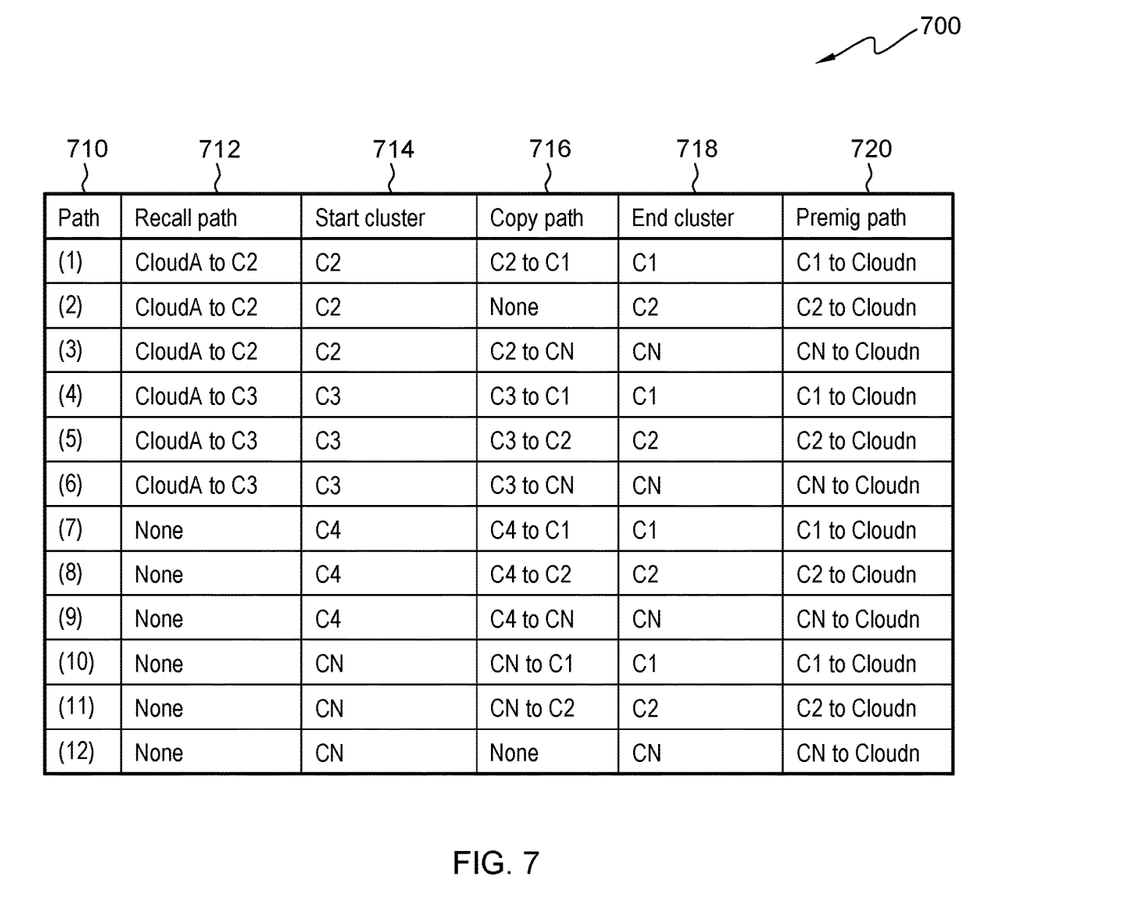
FIG. 7 is an example table of data paths for movement of data within networking computing environment 100, in accordance with at least one embodiment of the invention.

FIG. 7 is an example table 700 of data paths for movement of data within networking computing environment 100, in accordance with at least one embodiment of the invention. In this example, paths 710, recall paths 712, start cluster 714, copy path 716, end cluster 718, and premig path 720 are shown. In this example, data program 142-*n* is determining the paths for transferring Vol_Data to cloud storage n 160-*n* and removing Vol_Data from cloud storage A 160-1. In this example, the layout of networks and locations of Vol_Data are shown in FIGS. 1-3. In this example, Vol_Data is found in cloud storage A 160-1, also described as "CloudA" in FIG. 7, cluster 4 140-4, also described as "C4" in FIG. 7, and cluster n 140-*n*, also described as "CN" in FIG. 7. In this example, CloudA has a recall path to cluster 2 140-2, also described as "C2" in FIG. 7 and to cluster 3 140-3, also described as "C3" in FIG. 7. Additionally, cluster 1 140-1 is also described as 'C1" in FIG. 7. In this example, CloudN has a premigration path from C1, C2, and CN.

In an embodiment, for each of these paths, estimated time to transfer for a volume of data is calculated as follows. First, estimated time to process volumes in a queue in each cluster is calculated. In the example of the present invention, it is assumed that there each cluster has a queue and each queue corresponds to each type of transfer irrespective of the type of transfer path. For example, even if a cluster is connected to several clouds, recall from any one of the clouds is managed by a single recall queue. Copies to the cluster are assumed to be managed entirely by a single copy queue.

For simplicity, data transfers will be defined using the following nomenclature. In a cluster, $C_{xxx}$ is each type of transfer (recall, copy, or premig), (y→z) is each path (e.g., CloudA to C2 to recall, C4 to C6 to copy, and C1 to CloudN to premig, etc.), $S_{xxx(y \rightarrow z)i}$ is a size of i-th volume in a queue, $F_{xxxy \rightarrow z)i}$, is a transfer rate of a path to be used for the volume, and estimated time $T_{q\_xxx(y \rightarrow z)}$ to process volumes in the queue is obtained by adding all estimated transfer time of respective volumes using equation (1):

$$T_{q\_xxx} = \sum_{i=1}^{n} \frac{S_{xxx(y \rightarrow z)i}}{F_{xxx(y \rightarrow z)i}} \quad \text{Equation (1)}$$

In an embodiment, the size of each volume in the queue is managed within the queue and the latest statistical information is found in information repository 144-*n* to calculate the transfer rate, though any other methods or past statistical information may also be used to estimate a tendency based on days of week and time, etc., or artificial intelligence known in the art may be used for prediction.

By assuming that the size of Vol_A is $S_{Vol\_A}$, estimated transfer completion time of Vol_A in view of a state of queue in each path can be calculated using equation (2).

$$T_{Vol\_A\_xxx(y \rightarrow z)} = T_{q\_xxx} + \frac{S_{Vol\_A}}{F_{xxx(y \rightarrow z)}} \quad \text{Equation (2)}$$

In an embodiment, the estimated total transfer time $T_{Vol\_A\_j}$ of Vol_A by using a path (j) is determined using equation (3)

$$T_{Vol\_A\_j} = T_{Vol\_A\_recall(a \rightarrow b)} + T_{Vol\_A\_copy(c \rightarrow d)} + T_{Vol\_A\_premig(e \rightarrow f)} \quad \text{Equation (3)}$$

In an embodiment, because different paths are used for recall, copy, and premig, the equation is expressed herein with (a→b), (c→d), and (e→f). In the case of a path (1) of FIG. 7, for example, estimated total transfer time is calculated using equation (4):

$$T_{Vol\_A\_1} = T_{Vol\_A\_recall(cloudA \rightarrow C2)} + T_{Vol\_A\_copy(C2 \rightarrow C1)} + T_{Vol\_A\_premig(C1 \rightarrow CloudB)} \quad \text{Equation (4)}$$

Also, in the case of, of path (7) of FIG. 7, for example, path (7) with a recall path falling in 0, estimated total transfer time is calculated using equation (5):

$$T_{Vol\_A\_7} = 0 + T_{Vol\_A\_Copy(C4 \rightarrow C1)} + T_{Vol\_A\_premig(C1 \rightarrow CloudB)} \quad \text{Equation (5)}$$

Further, in the case of a path (12) of FIG. 7, in which time spent in a recall path and a copy path falls in 0, estimated total transfer time is calculated using equation (6):

$$T_{Vol\_A\_12} = 0 + 0 + T_{Vol\_A\_premig(C6 \rightarrow CloudB)} \quad \text{Equation (6)}$$

In an embodiment, if there is an example case like the path (12) of FIG. 7 with an end cluster being CN as shown in paths (3), (6), and (9) of FIG. 7, estimated total transfer time is always greater than $T_{Vol\_A\_12}$. Thus, by setting that "if a start cluster uses the same path as an end cluster, paths involving the same end cluster are omitted," the amount of calculation is reduced. However, there is no problem in making all calculations, such setting is optional in the present invention.

Data program 142-*n* determines weights (step 606). In an embodiment, data program 142-*n* determines weights for each start cluster, end cluster, recall path, copy path and premigration path. In an example, start cluster weigth is $W_{startCx}$ where x is the cluster, end cluster weight is $W_{endCx}$ where x is the cluster, recall path weight is $W_{recall(a \rightarrow b)}$ where recall from location a to b, copy path weight is $W_{copy(c \rightarrow d)}$ where copy is from location c to d, and premigration path weigh is $W_{premig(e \rightarrow f)}$ where copy is premigrated from e to f. In an embodiment, $W_{xxx}=1$ is a state with no weighting (default), and $W_{xxx}<1$ represents positive weighting to use the path or cluster with priority, and $1<W_{xxx}$ represents negative weighting to avoid the path or cluster. In an embodiment, data program 142-*n* may determine weights by accessing information repository 144-*n* to determine weights that have been pre-determined. In an alternative embodiment, data program 142-*n* may provide an indication, via a user interface, to a user to input weights for each path.

Data program 142-*n* determines weighted transfer time (step 608). In an embodiment, data program 142-*n* applies the weighs to each path transfer time to determine a total weighted transfer time for each path.

In an example, when weighting is applied to equation (3), estimated total transfer time $T'_{Vol\_A\_j}$ after weighting is calculated using equation (7):

$$T'_{Vol\_A\_j} = W_{recall(a \rightarrow b)} W_{startCx} T_{Vol\_A\_recall(a \rightarrow b)} + W_{startCx} W_{copy(c \rightarrow d)} W_{endCx} T_{Vol\_A\_copy(c \rightarrow d)} + W_{endCx} W_{premig(e \rightarrow f)} T_{Vol\_A\_premig(e \rightarrow f)} \quad \text{Equation (7)}$$

In this example, each $T_{xxx(y \rightarrow z)}$ is multiplied by $W_{xxx(y \rightarrow z)}$ relating to a path and $T_{xxx(y \rightarrow z)}$ of a path associated with a cluster is multiplied by $W_{xxxCx}$ relating to the cluster. Accordingly, $T_{copy(c \rightarrow d)}$ is multiplied by not only $W_{copy(c \rightarrow d)}$ but also $W_{startCx}$ relating to a start cluster and $W_{endCx}$ relating to an end cluster. In an example, in the case of the path (1) of FIG. 7, estimated total transfer time after weighting calculated using equation (8).

$$T'_{Vol\_A\_1} = W_{recall(CloudA \to C2)} W_{startC2}$$
$$T_{Vol\_A\_recall(CloudA \to C2)} + W_{startC2} W_{copy(C2 \to C1)}$$
$$W_{endC1} T_{Vol\_A\_copy(C2 \to C1)} + W_{endC1}$$
$$W_{premig(C1 \to CloudB)} T_{Vol\_A\_premig(C1 \to CloudB)} \quad \text{Equation (8)}$$

Data program 142-n applies optimal path (step 610). In an embodiment, data program 142-n determines the optimal path by determining the path with the minimum value. For example, the optimum path by calculating all the $T'_{Vol\_A\_j}$ and selecting a path with a minimum value.

Data program 142-n determines whether path requires recall (decision step 612). In an embodiment, data program 142-n determines whether the optimal path of step 610 involves a recall. In an embodiment, if data program 142-n determines a path does require a recall (decision step 612, yes branch), processing proceeds to step 614. In an embodiment, if data program 142-n determines does not require a recall, (decision step 612, no branch), processing proceeds to decision step 616.

Data program 142-n recalls data (step 614). In an embodiment, data program 142-n indicates to the cloud storage n 160-n which cluster n 140-n to recall data. In other words, data program 142-n indicates to cloud storage to transmit the data to the cluster. In an embodiment, data program 142-n may wait for a completion of recall indication before proceeding to decision step 616. As noted above, the operation of returning the migrated volume, which is stored in the secondary storage, cloud storage n 160-n, to the primary storage, cluster n 140-n, is referred to as "recall" or "to recall."

Data program 142-n determines whether path requires copy (decision step 616). In an embodiment, data program 142-n determines whether the optimal path of step 610 involves a recall. In an embodiment, if data program 142-n determines a path does require a copy (decision step 616, yes branch), processing proceeds to step 618. In an embodiment, if data program 142-n determines does not require a copy, (decision step 616, no branch), processing proceeds to decision step 620.

Data program 142-n copies data (step 618). In an embodiment, data program 142-n indicates to the appropriate cluster n 140-n to copy the data to the appropriate cluster n 140-n. In an embodiment, data program 142-n may wait for a completion of copy indication before proceeding to to step 620.

Data program 142-n premigrates data (step 620). In an embodiment, data program 142-n indicates to cluster n 140-n to the which cloud storage n 160-n to premigrate data. In other words, data program 142-n indicates to the cluster to transmit the data to cloud storage. In an embodiment, data program 142-n may wait for a completion of premigration indication before proceeding to step 622. As noted above, the operation of make a copy of a volume which is stored in in the primary storage, cluster n 140-n, to the secondary storage, cloud storage n 160-n, is referred to as "premigration" or "to premigrate."

Data program 142-n deletes data (step 622). In an embodiment, data program 142-n indicates to cluster n 140-n which has completed premigrating to delete the volume of data. In other words, data program 142-n indicates to the cluster to delete the data. As noted above, the operation of deleting a volume in the primary storage, cluster n 140-n, usually after premigration, is referred to as "migration" or "to migrate." In an embodiment, data program 142-n may delete the data based on user preference and there is no requirement that data be deleted.

Figure 8:
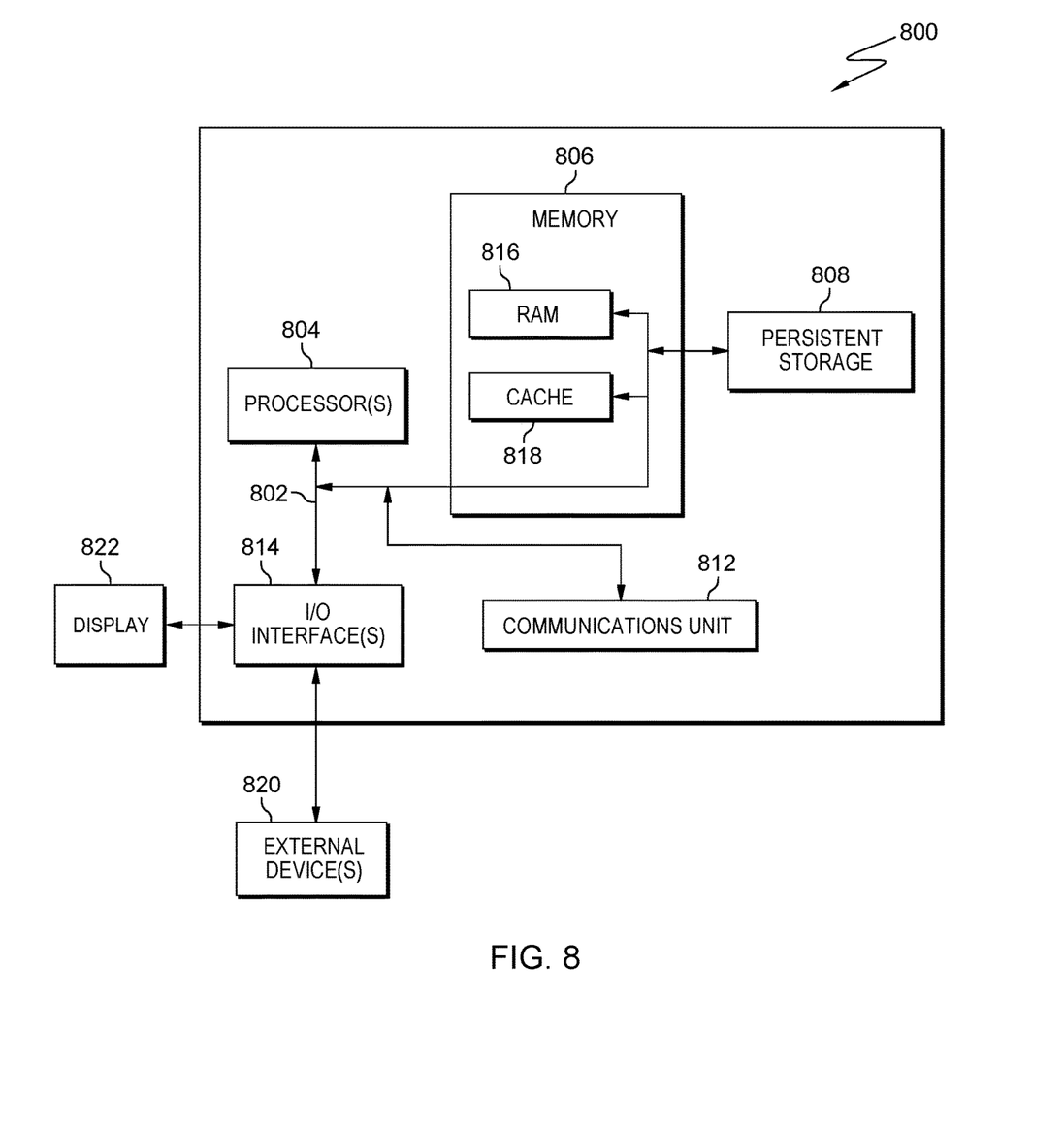
FIG. 8 is a block diagram depicting components of a computer, generally designated 800, suitable for executing data program 142-*n*, in accordance with at least one embodiment of the invention.

FIG. 8 is a block diagram depicting components of a computer 800 suitable for data program 142-n, in accordance with at least one embodiment of the invention. FIG. 8 displays the computer 800, one or more processor(s) 804 (including one or more computer processors), a communications fabric 802, a memory 806 including, a RAM 816, and a cache 818, a persistent storage 808, a communications unit 812, I/O interfaces 814, a display 822, and external devices 820. It should be appreciated that FIG. 8 provides only an illustration of one embodiment and does not imply any limitations with regard to the environments in which different embodiments may be implemented. Many modifications to the depicted environment may be made.

As depicted, the computer 800 operates over the communications fabric 802, which provides communications between the computer processor(s) 804, memory 806, persistent storage 808, communications unit 812, and input/output (I/O) interface(s) 814. The communications fabric 802 may be implemented with an architecture suitable for passing data or control information between the processors 804 (e.g., microprocessors, communications processors, and network processors), the memory 806, the external devices 820, and any other hardware components within a system. For example, the communications fabric 802 may be implemented with one or more buses.

The memory 806 and persistent storage 808 are computer readable storage media. In the depicted embodiment, the memory 806 comprises a random-access memory (RAM) 816 and a cache 818. In general, the memory 806 may comprise any suitable volatile or non-volatile one or more computer readable storage media.

Program instructions for data program 142-n may be stored in the persistent storage 808, or more generally, any computer readable storage media, for execution by one or more of the respective computer processors 804 via one or more memories of the memory 806. The persistent storage 808 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of the persistent storage 808.

The communications unit 812, in these examples, provides for communications with other data processing systems or devices. In these examples, the communications unit 812 may comprise one or more network interface cards. The communications unit 812 may provide communications through the use of either or both physical and wireless communications links. In the context of some embodiments of the present invention, the source of the various input data may be physically remote to the computer 800 such that the input data may be received, and the output similarly transmitted via the communications unit 812.

The I/O interface(s) 814 allow for input and output of data with other devices that may operate in conjunction with the computer 800. For example, the I/O interface 814 may provide a connection to the external devices 820, which may be as a keyboard, keypad, a touch screen, or other suitable input devices. External devices 820 may also include portable computer readable storage media, for example thumb drives, portable optical or magnetic disks, and memory cards. Software and data used to practice embodiments of the present invention may be stored on such portable computer readable storage media and may be loaded onto the persistent storage 808 via the I/O interface(s) 814. The I/O interface(s) 814 may similarly connect to a display 822. The display 822 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for data migration, the computer-implemented method comprising:
   receiving, by one or more computer processors, a data storage change for a piece of data, wherein the data storage change is from a first location to a second location;
   determining, by one or more computer processors, a plurality of candidate paths that may be used to perform the data storage change;
   for each given candidate path of the plurality of paths, determining, by one or more computer processors, a start cluster weight value for the given candidate path based on one or more start clusters associated with the given candidate path;
   for each given candidate path of the plurality of paths, determining, by one or more computer processors, an end cluster weight value for the given candidate path based on one or more end clusters associated with the given candidate path;
   for each given candidate path of the plurality of paths, determining, by one or more computer processors, a recall weight value for the given candidate path based on one or more recall paths associated with the given candidate path;
   for each given candidate path of the plurality of paths, determining, by one or more computer processors, a copy weight value for the given candidate path;
   for each given candidate path of the plurality of paths, determining, by one or more computer processors, a premigration weight value for the given candidate path;
   for each path of the plurality of candidate paths, determining, by one or more computer processors, a weighted transfer time for the given candidate path based on the start cluster weight value, the end cluster weight value, the recall weight value, the copy weight value and the premigration weight value for the given candidate path; and
   selecting a selected path by selecting the candidate path with the lowest weighted transfer time.

2. The computer-implemented method of claim 1, further comprising:
   performing the data storage change by communicating data from a source device to a destination device over the selected path.

* * * * *